(12) United States Patent
Bruno et al.

(10) Patent No.: US 7,810,486 B2
(45) Date of Patent: Oct. 12, 2010

(54) GRILL STRUCTURE

(75) Inventors: Adrian A. Bruno, Rolling Meadows, IL (US); Daniel S. Choi, Vernon Hills, IL (US); Leonard Zelek, Chicago, IL (US)

(73) Assignee: Weber-Stephen Products Co., Palatine, IL (US)

( * ) Notice: Subject to any disclaimer, the term of this patent is extended or adjusted under 35 U.S.C. 154(b) by 711 days.

(21) Appl. No.: 11/688,995

(22) Filed: Mar. 21, 2007

(65) Prior Publication Data

US 2007/0221194 A1   Sep. 27, 2007

Related U.S. Application Data

(60) Provisional application No. 60/786,781, filed on Mar. 27, 2006.

(51) Int. Cl.
A47J 37/00 (2006.01)
A47J 37/07 (2006.01)
A47J 36/34 (2006.01)

(52) U.S. Cl. ............. 126/41 R; 126/9 B; 126/9 R; 126/25 R; 126/50; 126/275 R; 312/108; 312/236; 312/264; 312/265.1; 280/47.34; 280/47.35

(58) Field of Classification Search ............. 126/9 B, 126/9 R, 19 M, 30, 37 R, 41 R, 50, 275 R, 126/304 R, 305, 25 R; 312/236, 108, 257.1, 312/263, 264, 265.1–265.6; 280/47.34, 47.35, 280/79.11, 79.3; A47J 37/00, 37/07, 36/34
See application file for complete search history.

(56) References Cited

U.S. PATENT DOCUMENTS 1,964,805 A * 7/1934 Barnes .................. 126/268
4,598,634 A * 7/1986 Van Horn, II ............ 99/340
4,718,399 A * 1/1988 Shepherd .............. 126/25 R
4,840,118 A * 6/1989 Rinehart ................ 99/446
4,848,316 A * 7/1989 Beller .................. 126/276
4,886,045 A * 12/1989 Ducate et al. .......... 126/41 R
4,984,515 A   1/1991 Pivonka
4,998,023 A * 3/1991 Kitts .................. 280/47.35
5,072,718 A * 12/1991 Seal .................... 126/41 R (Continued)

Primary Examiner—Steven B McAllister
Assistant Examiner—Daniel E Namay
(74) Attorney, Agent, or Firm—Baker & McKenzie LLP; David I. Roche; Daniel A. Tallitsch

(57) ABSTRACT

A cart suitable for supporting a grill, including a firebox. The cart has four panels each of which has all four of its edges bent to form a flange that provides structural rigidity and a connection feature for facilitating the assembly of the cart. Two opposing side panels are carried by and preferably welded to a respective side frame. The side frames are joined by upper crossbars, one at the front of the cart and a second at the rear of the cart. A bottom panel fits into and is carried by troughs formed by upturned lips on the lower edges of the side panels. The structural integrity and racking strength of the cart is enhanced by the attachment of a rear panels, which has a lower lip that locks into engagement with the rear edge of the bottom panel. The top edge of the rear panel is fastened to the rear upper crossbar to complete the basic structure of the cart. Hooks welded to the side frames allow easy and secure attachment of side and front attachments to the cart.

6 Claims, 6 Drawing Sheets

U.S. PATENT DOCUMENTS

| | | | | |
|---|---|---|---|---|
| 5,088,470 A * | 2/1992 | James et al. | | 126/41 R |
| 5,108,120 A * | 4/1992 | Jarmusz et al. | | 280/47.2 |
| 5,152,542 A * | 10/1992 | DeVoe | | 280/47.371 |
| 5,163,358 A * | 11/1992 | Hanagan et al. | | 99/339 |
| 5,452,707 A | 9/1995 | Harris et al. | | |
| 5,566,961 A * | 10/1996 | Snell et al. | | 280/47.35 |
| 5,579,755 A * | 12/1996 | Johnston | | 126/41 R |
| 5,590,938 A * | 1/1997 | De Andrea | | 312/257.1 |
| 5,713,584 A * | 2/1998 | Crane | | 280/47.35 |
| 5,758,635 A * | 6/1998 | Petersen | | 126/25 A |
| 5,934,183 A * | 8/1999 | Schlosser et al. | | 99/385 |
| 5,941,228 A * | 8/1999 | McKenzie | | 126/25 R |
| 5,941,229 A * | 8/1999 | Schlosser et al. | | 126/41 R |
| 6,050,256 A * | 4/2000 | French | | 126/25 R |
| 6,099,095 A * | 8/2000 | Irace | | 312/257.1 |
| 6,131,562 A | 10/2000 | Schlosser et al. | | |
| 6,250,022 B1 * | 6/2001 | Paz et al. | | 52/79.5 |
| 6,332,395 B1 * | 12/2001 | Home | | 99/340 |
| 6,561,082 B2 | 5/2003 | Gillespie | | |
| 6,619,600 B1 * | 9/2003 | Johnson et al. | | 248/129 |
| 6,708,601 B2 * | 3/2004 | Home | | 99/340 |
| 6,925,998 B2 * | 8/2005 | Bruno et al. | | 126/41 R |
| 6,978,722 B2 * | 12/2005 | Home | | 108/153.1 |
| 2002/0189604 A1 * | 12/2002 | McKenzie | | 126/30 |
| 2004/0035408 A1 * | 2/2004 | Szentkuti | | 126/41 R |
| 2004/0244790 A1 * | 12/2004 | McKenzie et al. | | 126/41 R |
| 2005/0279341 A1 * | 12/2005 | Chung | | 126/9 R |
| 2006/0054156 A1 * | 3/2006 | Zelek et al. | | 126/25 R |
| 2007/0089724 A1 * | 4/2007 | Home | | 126/9 R |
| 2007/0221202 A1 * | 9/2007 | Bruno et al. | | 126/41 R |

* cited by examiner

GRILL STRUCTURE

This application is based on and claims priority to U.S. Provisional Patent Application Ser. No. 60/786,781 which was filed on Mar. 27, 2006.

BACKGROUND AND SUMMARY OF THE INVENTION

Carts for barbecue grills are quite common and come in a variety of forms. Most carts used to support a barbecue grill are left outside and are, therefore, exposed to extreme environmental conditions including being left outside through a harsh winter and a hot summer. In addition, grill carts undergoes rough treatment, since they are designed to be frequently moved about an owner's property.

Fireboxes that are supported by barbecue grill carts tend to be quite heavy and require substantial structural support. Furthermore, since the temperature of a firebox on a barbecue grill can get extremely high, for safety purposes, structural stability of a barbecue grill cart is of utmost importance.

Examples of barbecue grill carts can be seen in the following United States Patents:

U.S. Pat. No. 4,984,515 shows a portable barbecue grill cart with various tubular members connected together by nuts and bolts with some telescopic engagement among cooperating tubular components to facilitate assembly. The cart of the '515 patent has no significant enclosure of the lower tank storage area, and obtains on structural benefit or stability from side panels. Another example of a grill cart is shown in U.S. Pat. No. 5,452,707, wherein the cart is comprised of several tubular members connected by wooden cross members and a bottom panel. U.S. Pat. No. 5,579,775 is an example of a barbecue grill cart that is formed of plastic legs that telescopically engage with plastic connecting parts and molded plastic panels. U.S. Pat. No. 5,941,229 is an example of a barbecue grill cart with rectangular tubular frame members with welded tabs as connecting structures. U.S. Pat. No. 6,332,395 is a further example of a barbecue grill cart with rectangular tubular members supported at their lower ends by a bottom panel with rectangular cutouts in the corners thereof. Finally, U.S. Pat. No. 6,561,082 is an example of a barbecue grill cart comprised of bent round tubing that is telescopically joined to form four main supports that are joined on four sides by connecting panels bolted to the tubular members.

All of the foregoing examples of prior art grill carts supporting a high temperature firebox, but have significant problems associated with resistance to racking forces and long-term stability in extreme environments.

In addition to pressure to improve strength, stability and safety, manufacturers of barbecue grills are under constant pressure from competitors to design their grill carts and components so that they are low cost and may be assembled with as little labor as possible. Labor associated with assembly of components is a key factor in achieving a low cost, yet high quality, barbecue grill and cart assembly.

The grill cart structure and methods of assembling a grill cart structure described herein are designed to maximize both the structural integrity of the grill cart and to maximize the ease with which the cart may be assembled. This is accomplished by forming two side panels, each of which is formed of an inverted, rectilinear U-shaped frame to which is affixed a side panel with a bent lower edge to provide the bottom of the side panel with additional structural strength. The side panel is preferably connected to the side frame by weld, but other means of connection may be used. The inverted U-shaped frames surrounding the side panels contain inwardly extending ears or tabs on the front and rear edges to which the front and rear upper cross bars may be attached joining the inside front and rear edges, respectively, of opposing left and right side panels. The bent lower edges of the left and right side panels each contain an upwardly and inwardly and inwardly angled lip designed to engage the left and right side edges, respectively, of a bottom panel. Fasteners are then used to connect the downwardly depending left and right side edges of the bottom panel to the lower edges of the left and right side panels, respectively. A rear panel has a similarly shaped (i.e., upwardly and inwardly angled) lip on its lower edge that is designed to engage the downwardly depending rear edge of the bottom panel. An inwardly extending horizontal flange on the upper edge of the rear panel engages the top of the rear horizontal cross bars and is fastened thereto. The lower edge of the rear panel is lifted into engagement with the rear edge of the bottom panel as the top flange of the rear panel is place on top of the rear cross bar. Each of the U-shaped side frames contains an upwardly facing front and rear side hook that is welded to the underside and outside face of the horizontal upper portion of the inverted U-shaped side frame. The hooks are intended to facilitate the attachment of a side tray or side burner housing. Front hooks, also upwardly facing extend are welded to the front face of the front part of the U-shaped side frame, and the front hooks allow for the easy attachment of a control panel housing to the grill cart structure.

The numerous advantages of the structure just described will become more apparent upon reading the following detailed description, when read in conjunction with the accompanying drawings.

DETAILED DESCRIPTION OF THE INVENTION

While the inventions shown and described herein are capable of being practiced with numerous alternative embodiments, a particular example is shown and described in detail herein. However, the embodiment shown and described in detail is merely an example of the many embodiments that could be made in accordance with the inventions that are claimed herein, and which will be apparent to those skilled in the art of grill cart design.

Figure 1:
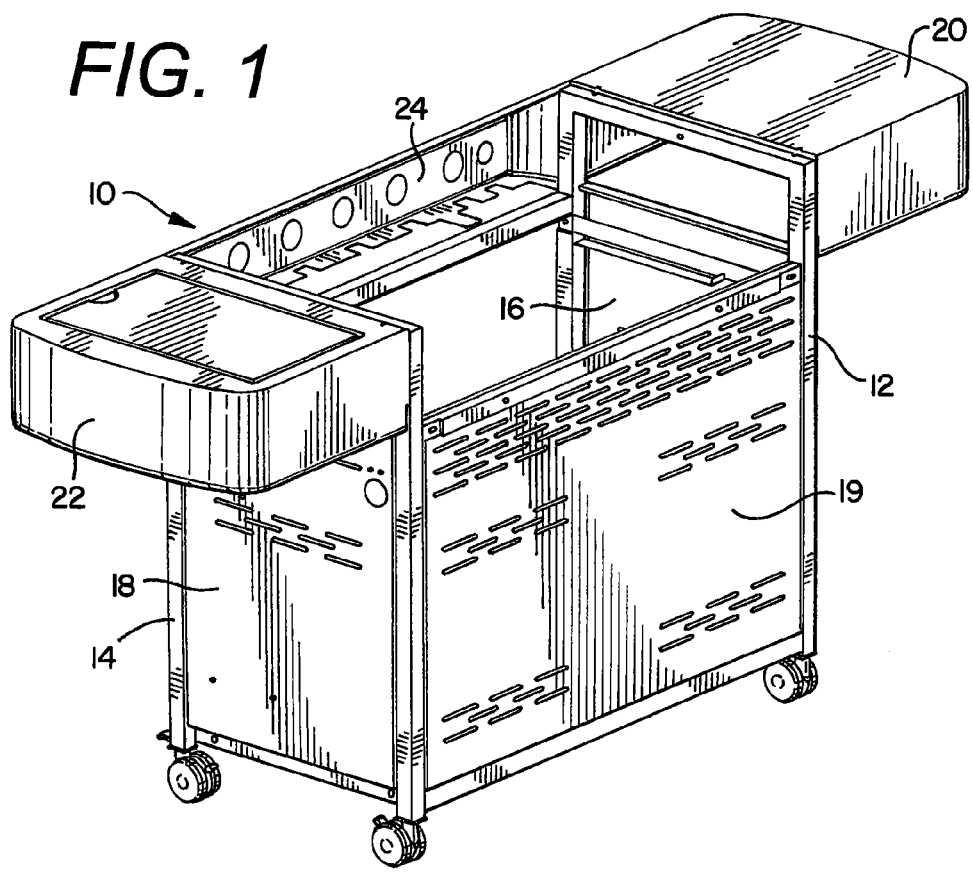
FIG. 1 is a perspective view of a grill cart made in accordance with the present inventions.

As illustrated in FIG. 1, a grill cart 10 includes two generally U-shaped side frames 12 and 14. The side frames 12 and 14 are generally in the form of rectilinear, inverted U-shaped structures, each comprising two parallel vertical components and a horizontal top connecting bar, preferably but not necessarily made of square tubing. It should be noted that the cart shown in FIG. 1 is arranged so that the rear of the cart is visible, and the rear panel 19 extends from the right side frame 14 to the left side frame 12. Note: because the cart 10 of FIG. 1 is oriented so that the rear panel 19 is visible in FIG. 1, the right side panel 18 is actually on the left in FIG. 1, and the left side panel 16 is on the right side of FIG. 1. Similarly, the left side attachment 20 is carried by the upper portion of the left side frame 12, and the ride side attachment 22 is connected to and carried by the left side frame 14. A front control panel housing 24 is connected to and carried by the left and right side frames.

Figure 2:
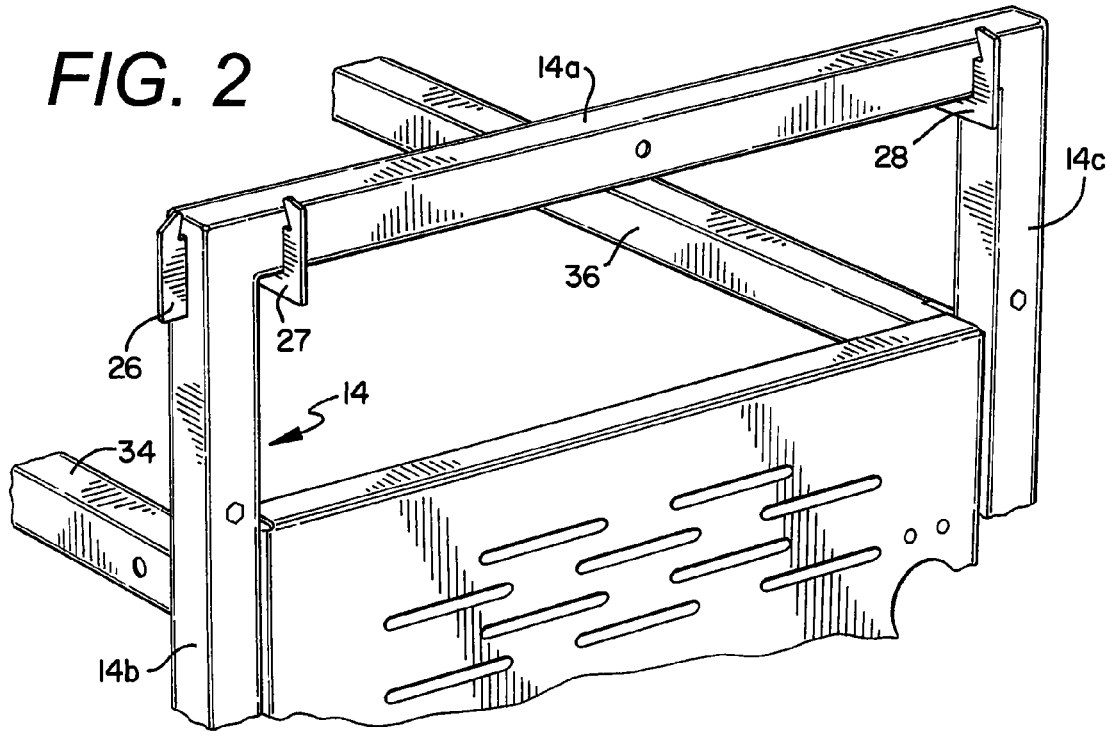
FIG. 2 is an enlarged perspective view of the right side of the grill cart shown in FIG. 1 with the right side attachment removed.

FIG. 2 shows an enlarged perspective view of the right side frame 14. A front cross bar 34 extends to the left from the right side frame 14, and a rear cross bar 36 similarly extends to the left of the right side frame. 2 L-shaped hooks 27 and 28 are welded to the horizontal component of the right side frame 14, and a front hook 26 is welded to the front facing portion of the vertical component of the right side frame 14.

Figure 3:
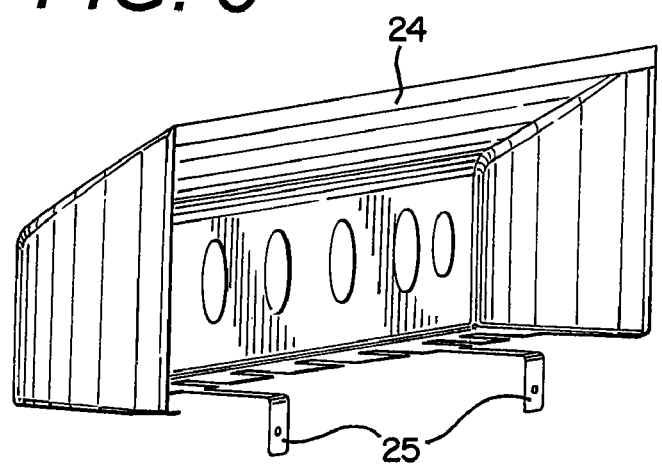
FIG. 3 is a perspective view of the control panel housing of the grill cart shown in FIG. 1.

FIG. 3 shows a front control panel housing 24 that is made with a rear flange that engages the front hooks 26 welded to the uppermost front-facing sides of the side frames 12 and 14. Once the housing 24 is placed onto the hooks 26, fasteners are then used to retain the straps 25 to the front cross bar 34.

Figure 4:
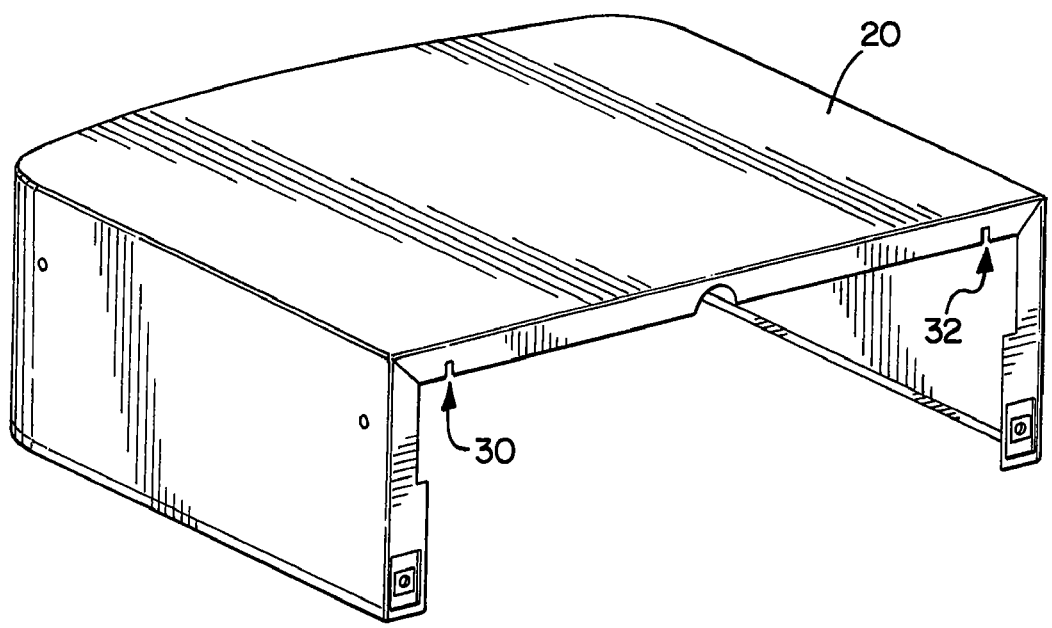
FIG. 4 is a perspective view of the left side attachment of the grill cart shown in FIG. 1.

FIG. 4 shows the left side attachment 20, which may or may not contain a side burner (not shown). Slots 30 and 32 engage L-shaped hooks welded to the horizontal component of the right side frame 12. Once the side attachment 20 is placed onto the L-shaped hooks welded to the vertical components of the left side frame 12, fasteners (preferably but not necessarily threaded) are used to secure the lower portion of the left side attachment 20 to the vertical components of the left side frame.

Figure 5:
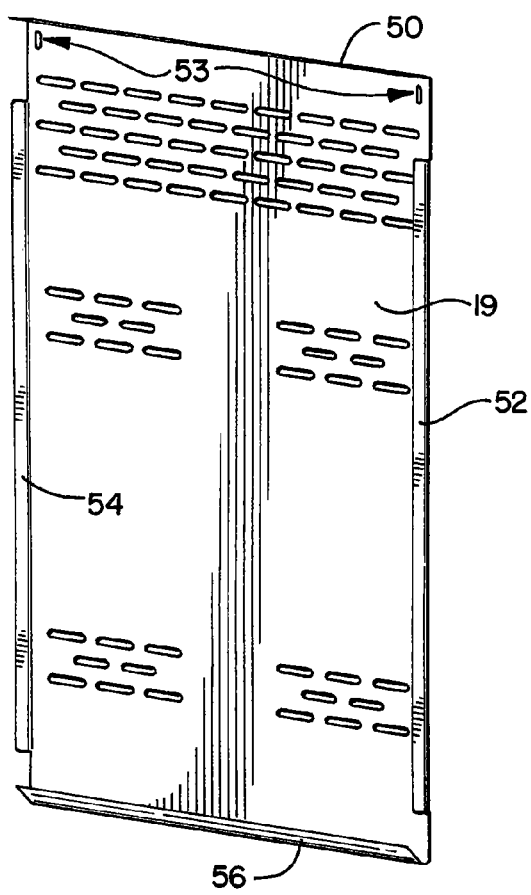
FIG. 5 is a perspective view of a rear panel of a grill cart.
Figure 6:
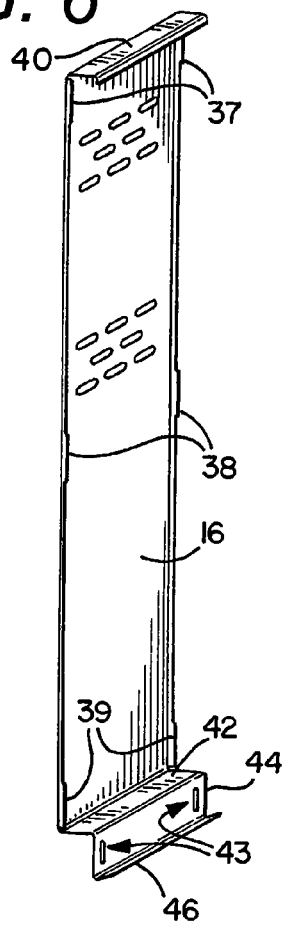
FIG. 6 is a perspective view of a side panel of a grill cart.
Figure 7:
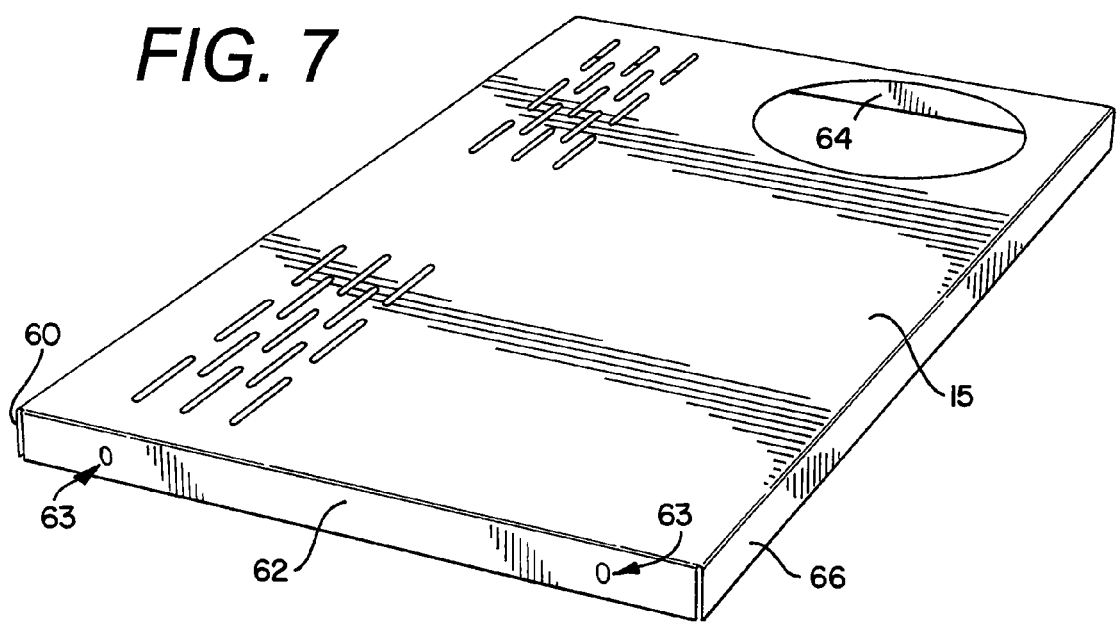
FIG. 7 is a perspective view of a bottom panel of a grill cart.

FIGS. 5, 6 and 7 show the rear side and bottom panels of the cart 10. FIG. 5 shows the rear panel 19 with an upwardly angled lower lip 56, a horizontal upper flange 50, and side flanges 52 and 54. The flanges at the edges of the panel 19 provide the rear panel 19 with stiffness that enhances the structural integrity of the rear panel. A common feature of each of the panels shown in FIGS. 5, 6 and 7 is that all four edges of these panels are bent to provide a flange that creates stiffness and/or a connection feature to each of the panels. In each case of the embodiment shown herein, the flanges formed on the edges of the side and bottom panels extends at least a major portion of the length of the edge from which it is formed.

FIG. 6 shows a typical side panel 16 (which could also be 18, since the side panels are identical in this particular embodiment). An upper flange 40 with a down-turned edge extends from the upper end of the side panel 16 shown in FIG. 6, and a lower flange 42 extends inwardly from the lower end of this side panel 16. A vertical lower inset 44, containing two apertures 43 extends downwardly from the inner edge of the lower flange 42. An upwardly angled lip 46 extends inwardly and upwardly from the lower edge of the lower inset 44. The vertical edges of the side panels 16 and 18 have slightly in-turned edges, and on each edge there are slightly enlarged weld points 37, 38 and 39 extending from in-turned vertical side edges. Each weld point 37-39 is used to rigidly connect the side panels 16 and 18 by welding to the vertical components of the side frames, 12 and 14, respectively. It is should be noted that welding the side panels to the side frames at six points (three on each side) is the preferred method of attachment, but other ways of affixing the side panels may also be used, such as bolts and/or screws or any other preferably rigid attachment technique.

FIG. 7 shows the bottom panel 15 with downwardly bent flanges on all sides. The bottom panel 15 has a downwardly depending front flange 66, a downwardly depending left side flange 62, a downwardly depending side flange 64 and a downwardly depending rear flange 60. Each of the side flanges 62 and 64 has a pair of openings 63 that are used to connect the bottom panel to a respective side panel, 16 and 18. Each of the panels shown in FIGS. 5, 6 and 7, the panels 15, 16 and 19 that comprise the sides, rear and bottom of the cart described herein, contains a flange on all four sides. These flanges are of varying sizes and function, but in each case provide the panel with structural rigidity that in conjunction with other features of the cart is significant.

Figure 8:
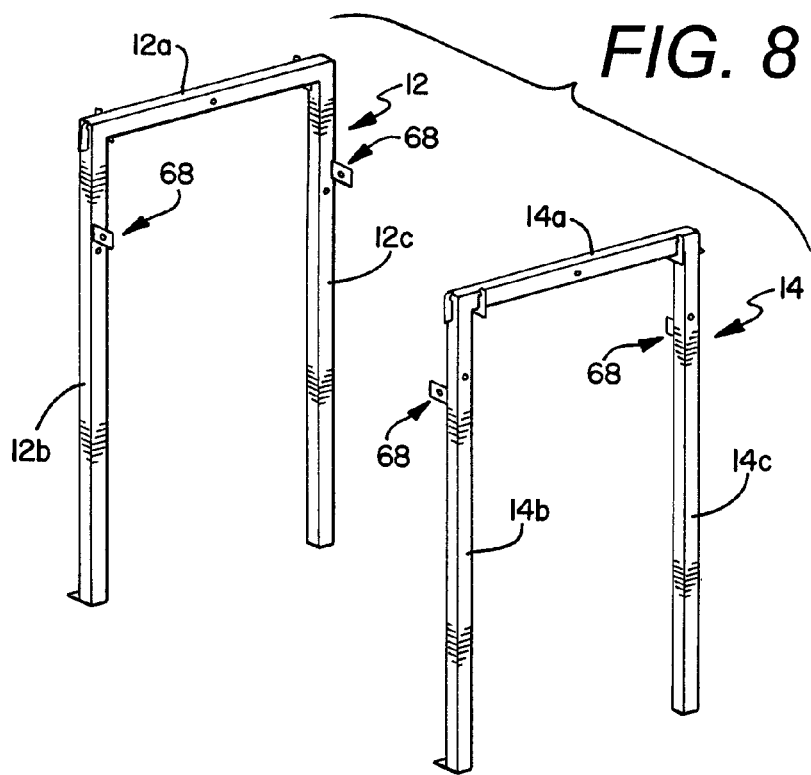
FIG. 8 shows two partial side frames in an early stage of assembly.

FIGS. 8-12 show important steps in the assembly of the grill cart that is the subject of the inventions claimed herein. FIG. 8 shows the left side frame 12 and the right side frame 14 facing each other. The left side frame 12 has an upper horizontal component 12a and two longer vertical components 12b and 12c. Front and rear cross bar connecting ears or tabs 68 are welded to the outside edges of the vertical components 12a and 12b. The crossbar connecting tabs 68 have apertures which are preferably tapped to receive threaded fasteners that are used to connect the cross bars to each of the side frames at both the front and the rear of each of the side frames. The right side frame 14 also has a horizontal upper component 14a and two longer vertical components 14b and 14c. Cross bar connecting tabs 68 are also welded to the outside edges of the vertical components 14b and 14c at a height that is approximately several inches from the top of the side frame.

Figure 9:
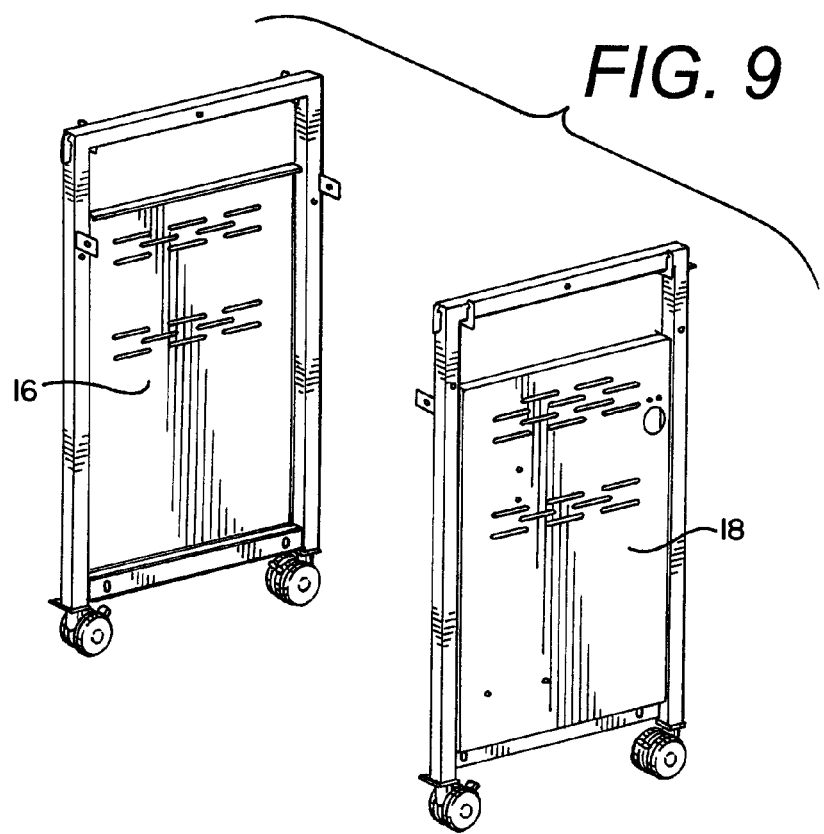
FIG. 9 shows the side frames of FIG. 8 with the side panels attached thereto.
Figure 10:
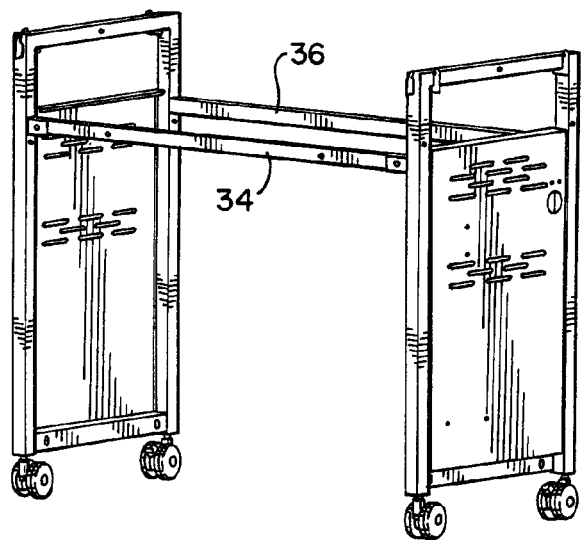
FIG. 10 is a third stage of assembly showing horizontal cross bars joining the two side frame.
Figure 11:
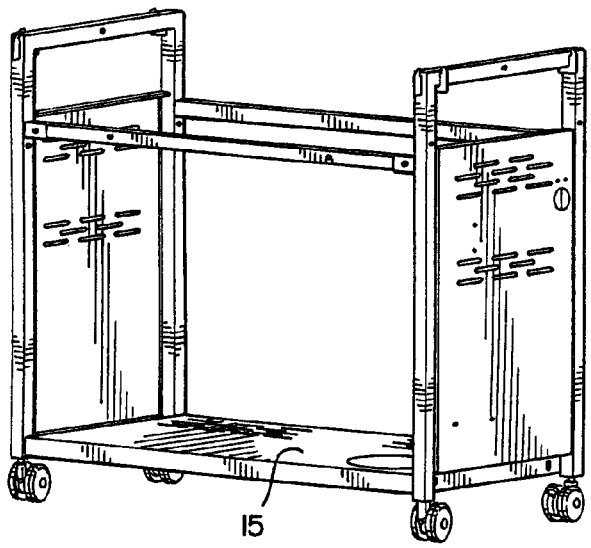
FIG. 11 shows a fourth stage of assembly in which a bottom panel is connected to the two side frames.

FIG. 9 shows the side frames 12 and 14 with their respective side panels 16 and 18 welded thereto, preferably at 6 points shown in more detail in FIG. 6. FIG. 10 shows the two side frames 12 and 14 with a front crossbar 34 connecting the side frames at the front side of the cart and a rear crossbar 36 connecting the side panels 12 and 14 at the rear of the cart. The connection between the crossbars 34 and 36 and the side frames 12 and 14 is preferably by the use of threaded fasteners that extend through openings in the ends of the crossbars aligned with tapped holes in the crossbar connecting tabs 68 (shown in FIGS. 8 and 9). With the crossbars connecting the upper parts of the side frames, the bottom panel 15 may be dropped in to place into the upwardly angled lips 46 on the extreme lower edges of the side panels 16 and 18. Alternatively, the bottom panel connection between the side frames may be made before the front and rear crossbars are connected to the side frames.

Figure 12:
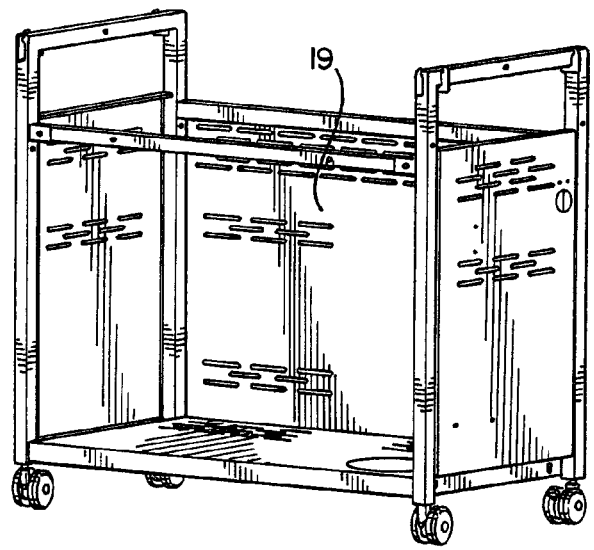
FIG. 12 shows a fifth stage of assembly in which a rear panel is attached to the grill cart.

Preferably two fasteners on each end of the bottom panel hold the bottom panel 15 into a channel formed by the lower lip 46 in the lower inset 44 of each of the side panels. See FIG. 13. FIG. 12 shows the grill cart 10 with the rear panel 19 attached. The attachment of the rear panel 19 is accomplished by lifting the lower lip 56 of the rear panel into engagement with the downwardly depending flange 60 of the rear panel 15, and placing the upper flange 50 of the rear panel 19 onto the upper horizontal face of the rear crossbar 36.

Two fasteners at each side of the upper portion of the rear panel 19 extend through openings 53 on the rear panel into the fastener receiving openings (which may be tapped holes) in the rear face of the rear crossbar 36.

Figure 13:
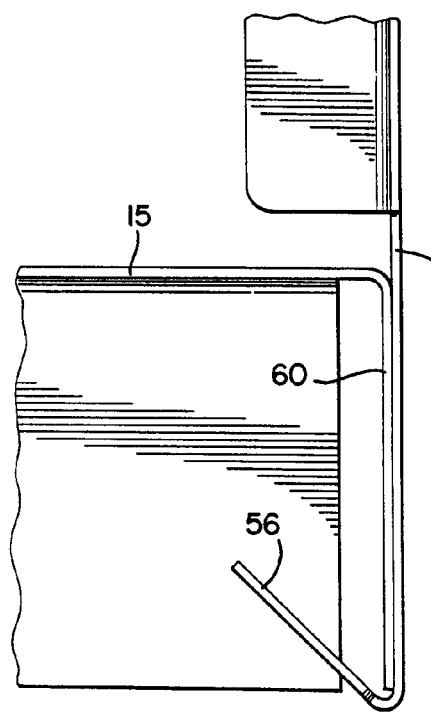
FIG. 13 is an enlarged perspective view in partial section showing the connection of the bottom panel to the side panel and the rear panel of the grill cart.
Figure 14:
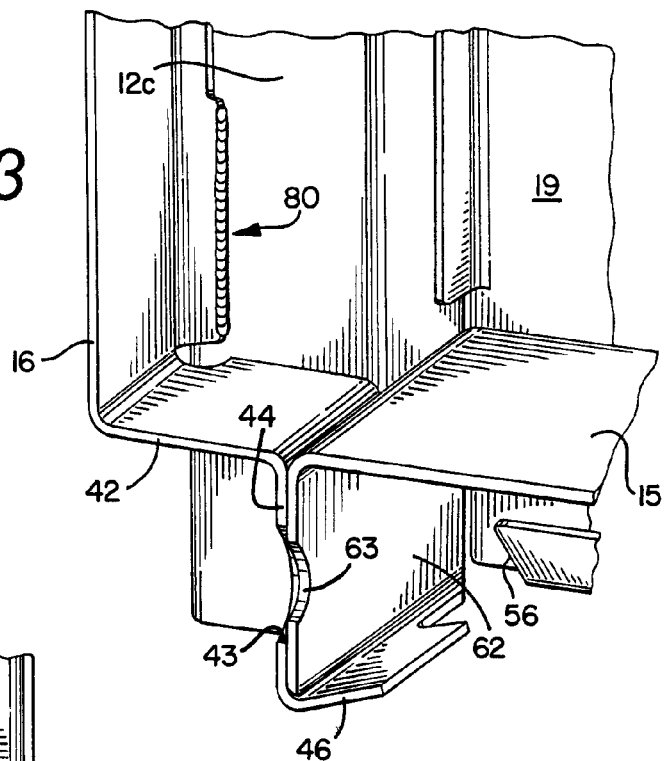
FIG. 14 is a sectional view showing the connection of the rear panel and the bottom panel.

FIG. 13 is an enlarged perspective view in partial section showing the way in which the bottom panel 15 engages the trough formed by the upwardly extending lip 46 of the side panel 16 and the trough formed by the upwardly extending lip 56 on the rear panel 19. The aperture 63 on the downwardly depending edge 62 of the bottom panel 15 aligns with an aperture 43 on the lower inset of the left side panel 16. Also shown in FIG. 13 is a typical weldment 80 formed between the inside surface of the vertical component 12c of the left side frame and the weld point 39 extending from the flange on the left side panel 16. FIG. 14 is a sectional view showing the engagement of the flange 60 and the lower portion of the rear panel 19.

Figure 15:
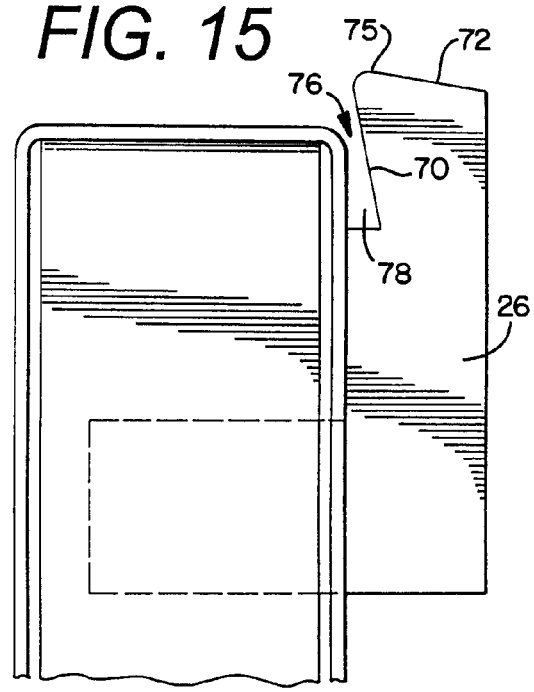
FIG. 15 is an enlarged sectional and view (partially schematic in the use of dotted lines) showing a hook used to facilitate the attachment of a front attachment (or in the dotted line embodiment, a left or right attachment) to the grill cart.

FIG. 15 shows a detail of the hooks 26 that are used to allow rapid attachment of front control panel housing to the cart. In the case of the hooks 27 and 28, which are generally L-shaped (shown by the dotted portion in FIG. 15), the hooks are welded on to the underside of the horizontal component of the side frame and are welded onto the outwardly facing surface of the horizontal component of the side frame. In the case of the hooks 26 used to attach the front control panel housing 24, such as hook 26 in FIG. 2, the hooks are welded to the upper portion of the outside faces of the front vertical components of the left and right side frames. Each hook has a slanted top surface 72 and a slanted vertical inside edge 70 which converge to form a bearing point 75. The hook is arranged to form a slot 76 and a clearance 78 that allows the side attachments to be angled into position without bending the edge of the side attachment that engages the hook. The slots 30 and 32 (FIG. 4) engage the L-shaped hooks in the underside of the side attachment engages the bearing point 75. Once the side attachment is hung on the hooks, the fasteners may be used to retain the lower portion of the side attachment to the vertical components 12b, 12c and 14b and 14c of the respective side frames.

While a specific example of a grill cart structure and method of assembling the cart have been illustrated and described herein, it will be apparent to persons of skill in the art of cart design that numerous modifications, variations and improvements of the embodiment described herein may be made without departing from the spirit and scope of the following claims.

We claim:

1. A cart comprising: two side panels, each having a lower edge with an up-turned lip, the side panels being carried by two generally inverted and U-shaped side frames, each side frame having two hooks facing outwardly for use in supporting a side attachment and a front hook for carrying and supporting a front attachment, the side frames being joined by front and rear crossbars, a rear panel with a lower inwardly facing lip, a bottom panel having downwardly depending rear and side edges that fit into troughs formed by said lips.

2. A cart according to claim 1 wherein the side panels are welded to the side frames.

3. A cart according to claim 1 wherein at least one hook carried by at least one of the side frames carries a side attachment.

4. A cart according to claim 1 wherein each of the panels, both side and bottom, has all four of its edges bent to form a flange, each of said flanges extending at least a major portion of the length of the edge of the panel from which it is formed.

5. A method of assembling a cart having two side frames each having two hooks facing outwardly for use in supporting a side attachment and a front hook for carrying and supporting a front attachment, and each with a side panel, a rear panel and a bottom panel, each side panel having an upturned inwardly extending lip at the lower edge thereof, and an upturned inwardly extending lip at the lower edge of the rear panel, the method comprising the following steps, not necessarily in the following order:

affixing the side panels to the side frames, connecting one end of a front crossbar to a front upper portion of each the side frames, connecting one end of a rear crossbar to a rear upper portion of each the side frames, placing one end of the bottom panel in an upwardly facing trough at the lower end of each of said side frames, lifting a trough formed by the lip on the rear panel into engagement with a rear edge on the bottom panel and connecting the upper end of the rear panel to the rear crossbar.

6. A method according to claim 5, wherein the rear panel has an upper horizontal flange, including the additional step of placing the upper flange of the rear panel onto the rear crossbar.

\* \* \* \* \*